(12) United States Patent
Miljkovic et al.

(10) Patent No.: US 8,868,289 B2
(45) Date of Patent: Oct. 21, 2014

(54) VEHICLE LOCATION NAVIGATION SYSTEM

(71) Applicant: Automatic Labs, Inc., San Francisco, CA (US)

(72) Inventors: Ljubinko Miljkovic, San Francisco, CA (US); David Theron Palmer, San Francisco, CA (US); Ramprabhu Jayaraman, San Francisco, CA (US)

(73) Assignee: Automatic Labs, Inc., San Francisco ( * ) Notice: Subject to any disclaimer, the term of this patent is extended or adjusted under 35 U.S.C. 154(b) by 0 days.

(21) Appl. No.: 13/861,809

(22) Filed: Apr. 12, 2013

(65) Prior Publication Data

US 2013/0274953 A1 Oct. 17, 2013

Related U.S. Application Data

(60) Provisional application No. 61/623,708, filed on Apr. 13, 2012.

(51) Int. Cl.
| | | |
|---|---|---|
| *G01C 21/00* | (2006.01) | |
| *G07C 5/00* | (2006.01) | |
| *G08G 1/00* | (2006.01) | |
| *B60R 25/102* | (2013.01) | |

(52) U.S. Cl.
CPC ............... *G01C 21/00* (2013.01); *G07C 5/008* (2013.01); *B60R 25/102* (2013.01); *G08G 1/205* (2013.01)
USPC ........ 701/32.3; 701/32.4; 701/31.5; 701/517; 340/990

(58) Field of Classification Search
CPC ............ B60R 25/102; B60R 2325/101; B60R 2325/106; B60R 2325/205; G07C 5/02; G07C 5/008; G08G 1/005; G08G 1/205; G08G 1/096
See application file for complete search history.

(56) References Cited

U.S. PATENT DOCUMENTS

| | | | |
|---|---|---|---|
| 2008/0082221 A1* | 4/2008 | Nagy | 701/2 |
| 2008/0255718 A1* | 10/2008 | Tuff | 701/29 |
| 2010/0073201 A1* | 3/2010 | Holcomb et al. | 340/990 |
| 2010/0211307 A1* | 8/2010 | Geelen | 701/201 |
| 2011/0093159 A1* | 4/2011 | Boling et al. | 701/32 |
| 2011/0112717 A1* | 5/2011 | Resner | 701/33 |
| 2011/0227709 A1* | 9/2011 | Story | 340/10.42 |
| 2011/0313593 A1* | 12/2011 | Cohen et al. | 701/2 |
| 2012/0078497 A1* | 3/2012 | Burke, Jr. | 701/300 |
| 2012/0176255 A1* | 7/2012 | Choi et al. | 340/989 |

* cited by examiner

*Primary Examiner* — Michael J Zanelli
(74) *Attorney, Agent, or Firm* — Donald R. Boys; Central Coast Patent Agency, Inc.

(57) ABSTRACT

An apparatus includes a connector to an on board diagnostic (OBD) port of a vehicle, wireless communications circuitry, a processor and a memory, the memory storing instructions that when executed by the processor cause the processor to monitor the ignition state of the vehicle, and upon detecting an ignition off state, reporting at least the off state to a network-enabled communications appliance wirelessly paired for wireless communication with the apparatus.

11 Claims, 5 Drawing Sheets

VEHICLE LOCATION NAVIGATION SYSTEM

CROSS-REFERENCE TO RELATED DOCUMENTS

The present specification claims priority to provisional patent application 61/623,708 filed on Apr. 13, 2012, and all disclosure of that parent case is incorporated at least by reference.

BACKGROUND OF THE INVENTION

1. Field of the Invention

The present invention is in the field of network-based navigation systems and pertains particularly to an apparatus for reporting parked location of a vehicle for later navigation to the parked vehicle location.

2. Discussion of the State of the Art

In the field of navigation systems, global positioning satellite data is used to pin point fixed geo-locations enabling server-based instruction including real-time navigation to any fixed geo-location. In some related applications, GPS information has also been used to track moving vehicles in real time and to enable vehicle operators to find parked vehicles in cases where the operator becomes lost and cannot find a vehicle or does not remember the location of a parked vehicle. This is achieved by adding a third-party vehicle accessory that includes a global positioning satellite (GPS) receiver and Internet network reporting capability. Without installation of such an expensive GPS receiver, users may be required to physically map a parked location by manually marking a digital map of the parked vehicle location on a hand-held device like a cell phone before leaving the location so they may later follow the map back to the vehicle.

Therefore, what is clearly needed is an inexpensive apparatus that may be plugged into the onboard diagnostic (OBD) port of a vehicle that, in combination with a personal communications appliance automatically gathers and reports the information required to obtain navigation instructions back to a lost vehicle, eliminating expense of third-party device installation or the labor associated with manual location plotting.

SUMMARY OF THE INVENTION

In one embodiment of the present invention, an apparatus is provided comprising a connector to an on board diagnostic (OBD) port of a vehicle, wireless communications circuitry, a processor and a memory, the memory storing instructions that when executed by the processor cause the processor to monitor the ignition state of the vehicle, and upon detecting an ignition off state, reporting at least the off state to a network-enabled communications appliance wirelessly paired for wireless communication with the apparatus.

In one embodiment, the apparatus further reports the current date, time, and location information of the vehicle if available upon detecting an ignition off state. In one embodiment, the location information is global positioning satellite (GPS) coordinates accessed and recorded by the vehicle or the apparatus using a GPS device.

In one embodiment of the invention, the wireless communication circuitry is Bluetooth™ circuitry. In one embodiment, the wireless communications appliance provides GPS coordinates using a GPS device and adds the information to the information received from the apparatus. In one embodiment, the communications appliance is one of a smartphone, a tablet device, or a wirelessly operated computer.

In one embodiment of the present invention, a method is provided comprising the acts monitoring of the ignition state of a vehicle via an apparatus having a processor and a memory, a connector to an onboard diagnostic (OBD) port of a vehicle, and wireless communications circuitry, when detecting an ignition off state, reporting at least the state to a network-enabled communications appliance paired for wireless communication with the apparatus, from the wireless communications appliance, uploading the ignition state, time, date, and location information to a network-connected server, at the server, validating and storing the state including associated information, upon a request received at the server from an authorized user, processing the information including location information and serving it to the requesting communications appliance.

In one embodiment of the invention, the wireless communications circuitry is Bluetooth™ circuitry. In one embodiment, the information includes global positioning satellite (GPS) data indicating the last location of the vehicle upon detecting the ignition off state. In one embodiment, the GPS data is accessed by the vehicle or the apparatus using a GPS device. In one embodiment, the GPS data is accessed by the wireless communications appliance using a GPS device.

In one embodiment of the invention, the server is a location-mapping server. In one embodiment, the server serves a digital map marking the location of the vehicle and the location of the requestor. In one embodiment the server serves navigation instructions from the requestor location to the vehicle location. In one embodiment, the navigation instructions include voice prompts.

BRIEF DESCRIPTION OF THE DRAWING FIGURES

DETAILED DESCRIPTION

The inventor provides a device for recording a last location of a vehicle in the event of ignition off state, and a system for informing a user of the last location of the vehicle upon request. The present invention is described in enabling detail using the following examples, which may describe more than one relevant embodiment falling within the scope of the present invention.

Figure 1:
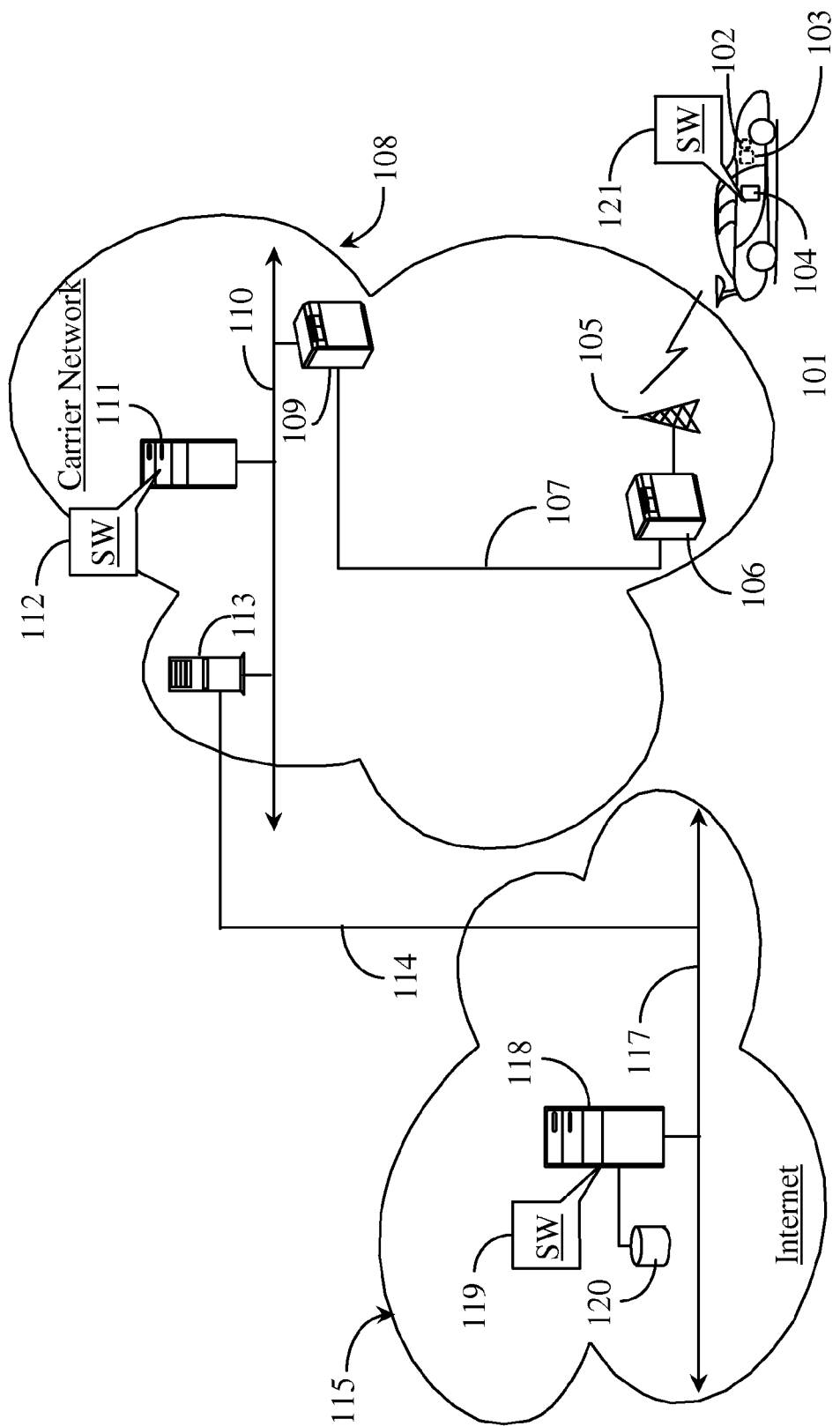
FIG. 1 is an architectural diagram depicting a data network supporting vehicle location in an embodiment of the invention.

FIG. 1 is an architectural diagram depicting a data network 100 supporting vehicle location in an embodiment of the invention. Data network 100 includes a wireless carrier network 108 and the Internet network 115. Carrier network 108 may be a cellular network or a wireless fidelity (WiFi) network, or some other wireless communications network, including a satellite network without departing from the spirit and scope of the invention. Internet network 115 may be a corporate wide area network (WAN) or a municipal area network (MAN), or some other type of digital network without departing from the spirit and scope of the invention. Internet 115 is further exemplified by an Internet backbone 117. Internet backbone 117 includes all of the lines, equipment, and access points that make up the Internet as a whole including any connected sub-networks. Therefore, there are no geographic limitations to the practice of the present invention.

In one embodiment of the present invention, a vehicle 101 is illustrated and is equipped with an onboard diagnostics (OBD) system (not illustrated). As is known in the art, the OBD system is accessible via an OBD connector 102. Vehicle 101 may be an automobile, a truck, a bus, or a recreation type vehicle without departing from the spirit and scope of the invention. A vehicle location device 103 is illustrated herein and has connection to the OBD system through an OBD port illustrated herein as OBD port 102. Vehicle location device 103 connects directly to OBD connector 102, which in turn, provides direct access to the onboard diagnostics system.

Vehicle location device 103 is wirelessly enabled in this example with Bluetooth™ wireless technology. A wireless communications appliance 104 is illustrated in this embodiment. Wireless communications appliance 104 represents an appliance owned and operated by the owner or operator of vehicle 101. Wireless communications appliance 104 may be a smart phone, an android device, or a computing appliance like a tablet, a notebook, or a laptop computer without departing from the spirit and scope of the invention.

In this example, wireless computing appliance is a smart phone and will hereinafter be referred to as smart phone 104. Smart phone 104 is network-enabled meaning that it may be leveraged to access and navigate a network such as the Internet network using browser technology. In this example, smart phone 104 and vehicle location device 103 are wirelessly paired for communication via Bluetooth™.

Smart phone 104 may connect to Internet network 115 via a cellular tower 105 associated with a local base station 106 using network path 107 and a regional base station 109 to communicate with a wireless Internet service provider represented herein by a facility 111 located within carrier network 108. Carrier network 108 operates using regional base station 109 and internal network structure 110, which supports facility 111 running associative software (SW) 112. SW 112 includes all of the required instruction to enable facility 111 to function as a wireless Internet service provider (access point). Carrier network 108 has connection to Internet 115 via a gateway 113 and an Internet access line 114.

Internet backbone 117 supports an Internet server 118. Internet server 118 includes a processor and memory, the memory hosting software (SW) 119. Server 118 may be hosted by a third-party providing location and navigation services according to an embodiment of the present invention. Server 118 has connection to a data repository 120. Data repository 120 may contain client data such as registration data, billing information, and location/navigation information, which may be served or otherwise made available to clients in the field such as one operating vehicle 101.

In use of the invention, an owner or operator of vehicle 101 connects device 103 to the OBD system through OBD port 102 while operating the vehicle. The operator may configure smart phone 104 to wirelessly connect to device 103 automatically when both the device and appliance are booted up or otherwise powered on. In one embodiment, device 103 has instruction in memory, which when executed, cause a processor on the device to monitor the ignition state of vehicle 101 and upon detecting an ignition "off" state, reporting the state as it occurs to smart phone 104.

In one embodiment, smart phone 104 has software 121 executing from a non-transitory medium that provides an interface to receive the data events transmitted thereto from device 103. In one embodiment, device 103 may access global positioning satellite (GPS) data from the OBD system if so equipped. In another embodiment, device 103 may be GPS-enabled. In this way, both the "OFF" ignition state of the vehicle and the GPS coordinates at the time may be communicated wirelessly from device 103 to smart phone 104. In still another embodiment, the GPS data may be provided by the smart phone at the time it receives the OFF state indication from device 103.

Each time that smart phone 104 receives an ignition OFF event, it may upload the data to server 118 in Internet network 115. The server, with the aid of SW 119 keeps at least the latest uploaded event (ignition OFF) and the associated GPS coordinates. If an owner or operator of the vehicle needs to determine where the vehicle is, they may connect to the server and authenticate using their smart phone or other appliance and receive instruction, which may include a digital map with location information and, in one embodiment, navigation instruction.

Figure 2:
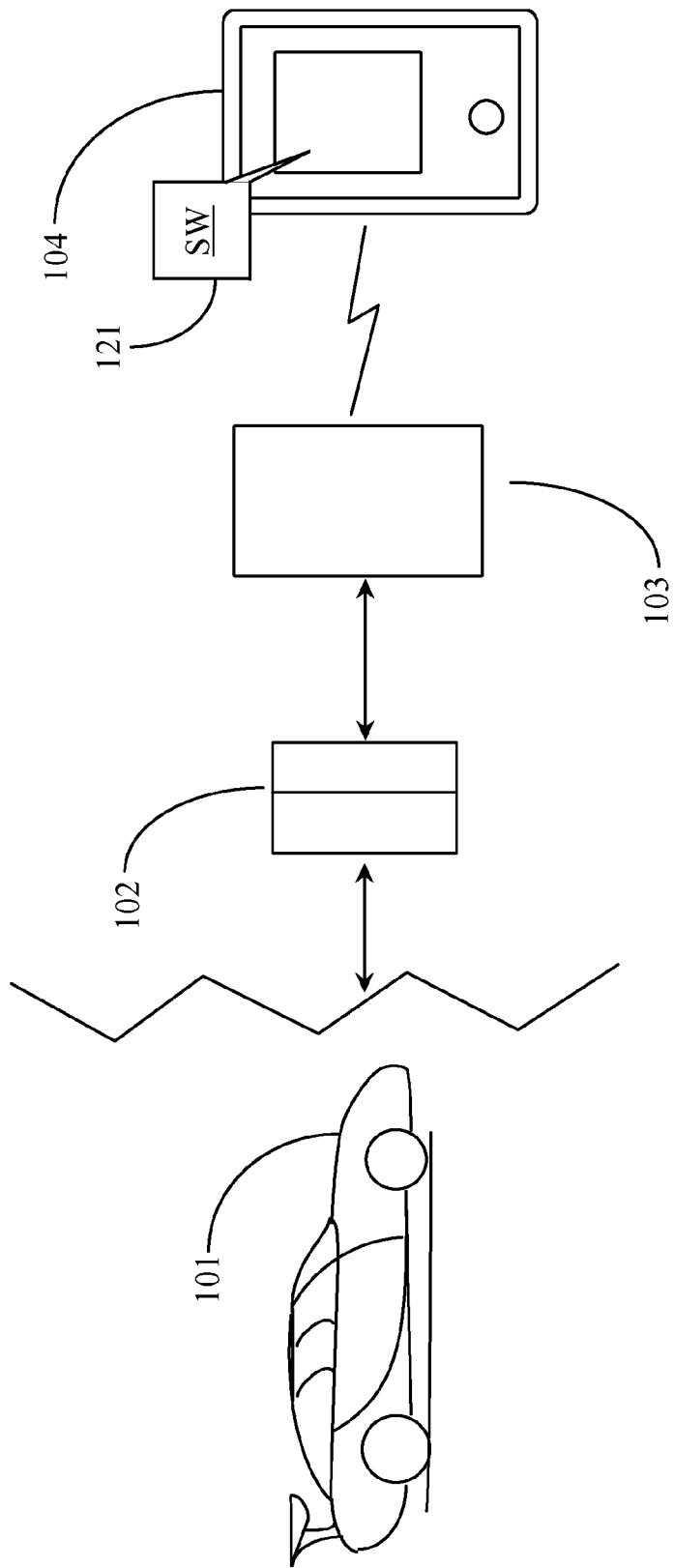
FIG. 2 is a block diagram depicting connectivity between components according to an embodiment of the invention.

FIG. 2 is a block diagram illustrating connectivity between basic components. In a preferred embodiment of the invention, vehicle 101 is equipped with an onboard diagnostics system accessible through OBD port 102. Vehicle location device 103 can connect directly to OBD port using an OBD connector. OBD-connected vehicle location device 103 may record and communicate critical data to smart phone 104 such as ignition off state, as well as, location data. Vehicle location device 103 may communicate with smart phone 104 through Bluetooth™ pairing or another wireless communication protocol like wireless universal serial bus (USB) or near field communication (NFC). SW 121 executing from a non-transitory medium on smart phone 104 aids in relaying data communicated from location device 103 to an associated Internet server like Internet server 118 of FIG. 1.

Figure 3:
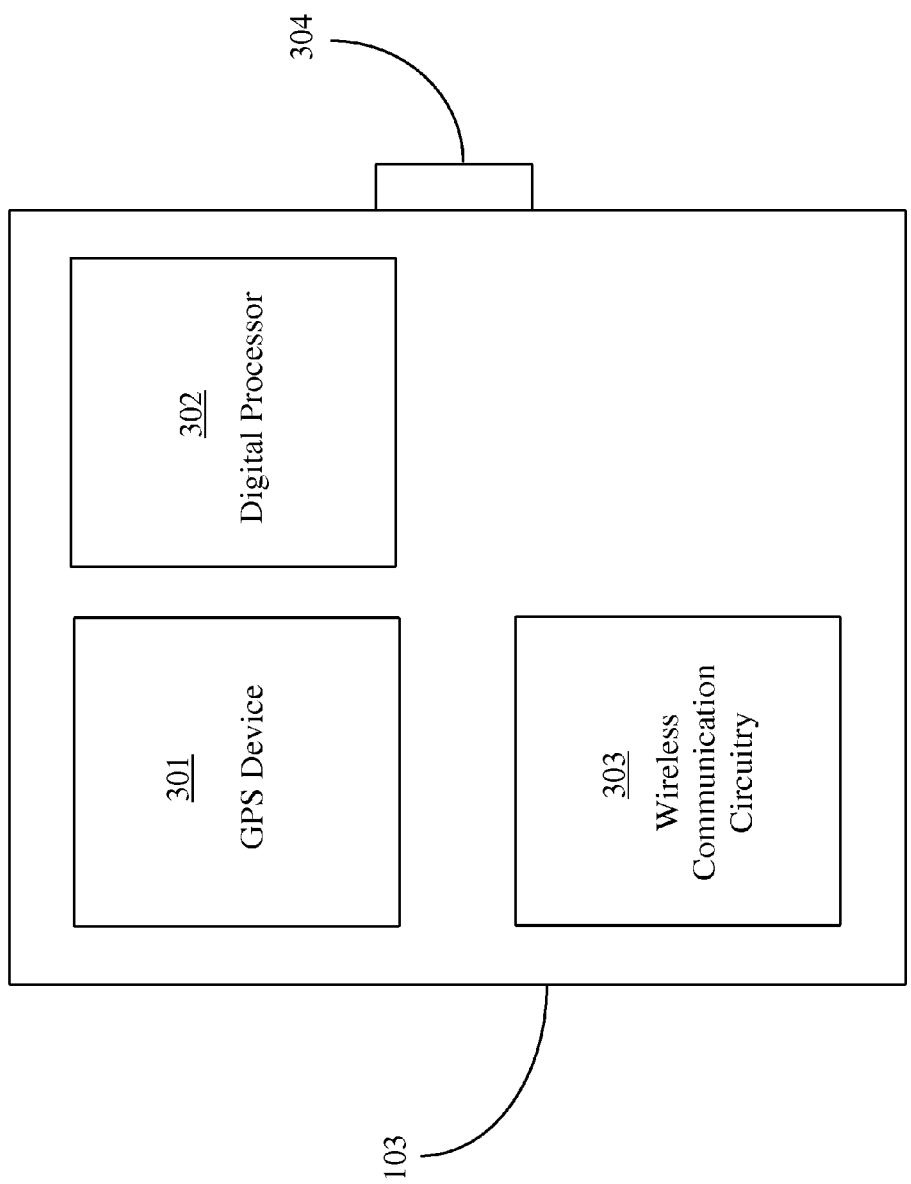
FIG. 3 is a block diagram depicting basic components of a vehicle location device 103 of FIG. 2.

FIG. 3 is a block diagram depicting basic components of vehicle location device 103 of FIG. 2. In one embodiment of the invention, vehicle location device 103 may contain global positioning satellite (GPS) device 301. In one embodiment, the GPS device may be located in a vehicle computing system in vehicle 101. In another embodiment, the GPS device may be located in smart phone 104 of FIG. 2. Vehicle location device 103 includes a digital processor 302, and Bluetooth™ wireless communications circuitry 303. Location device 103 may include other components common to electronics devices without departing from the spirit and scope of the present invention such as user interfacing features including on/off switch, a reset button, one or more visual indicators, and so on. Vehicle location device 103 connects to OBD connector 102 (FIG. 1) using plug 304, which may be a male pin connector.

In this embodiment, location device 103 performs the function of monitoring a host vehicle for the event of "ignition off" state. In another embodiment of the invention, vehicle location device 103 may not include (GPS) 301 as described above, and may instead rely upon GPS available in vehicle 101. In this embodiment, location device 103 might monitor the vehicle for the event of ignition off state and the GPS data associated with the ignition off event. In still another embodiment of the invention, vehicle location device 103 and vehicle 101 may not have an onboard GPS device, and may instead rely upon a GPS device available in smartphone 104. In this embodiment, location device 103 might only monitor the vehicle for the event of ignition off state.

Figure 4:
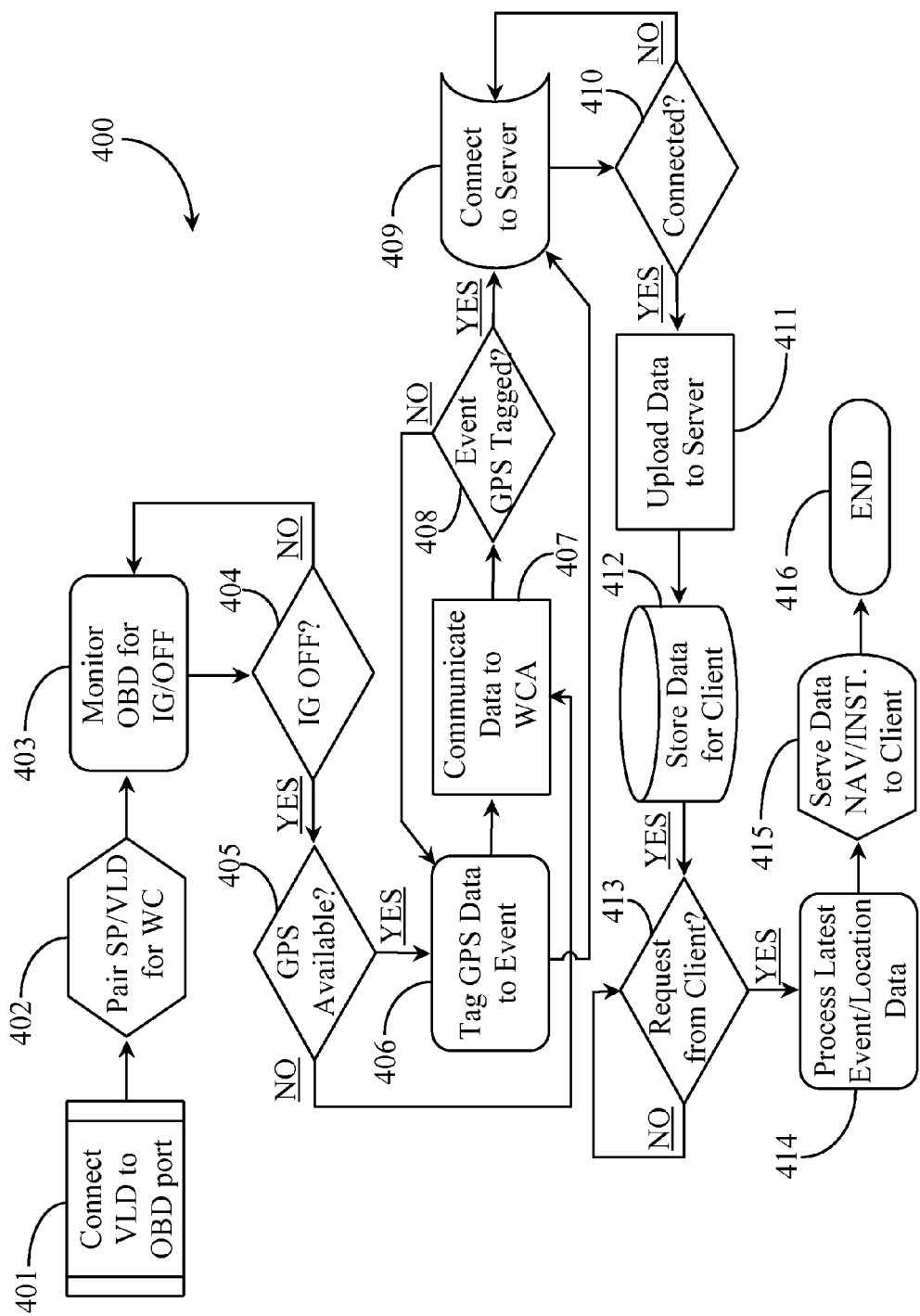
FIG. 4 is a process flow chart 400 depicting acts for locating a vehicle in the event of a reported ignition off state.

FIG. 4 is a process flow chart 400 depicting acts for locating a vehicle in the event of a reported ignition off state. At act 401, a user connects the vehicle location device analogous to device 103 of FIG. 2 to the OBD port of the vehicle. Assuming the vehicle location device is not already paired with the wireless communications appliance, such as smart phone 104, the user may pair the components for wireless communications such as Bluetooth™ communications at act 402. The vehicle location device may monitor the ignition state of the vehicle at act 403.

If the monitored data does not indicate that ignition has been shut off in act 404, the process loops back to act 403 where the location device will simply continue to monitor data. If the data monitored indicates that the ignition has been shut off at act 404, the location device may determine if GPS data is available in act 405. If GPS data is not available in act 405 the process may skip directly to act 407 where the location device communicates the data to the wireless communications appliance (WCA). This may be in the form of a message or alert sent to the WCA using Bluetooth™, for example, indicating the event of ignition off state.

If GPS data is available either on board the vehicle computing system or in the vehicle location device at act 405, the vehicle location device may tag the GPS coordinate data to the event state in act 406. The process may then proceed to act 407 where the location device communicates the data to the WCA. It is noted herein that in one aspect of the method, the location device 103 is equipped with a GPS device. In another aspect, the OBD system includes a GPS device. In still another aspect, the GPS device may be available on the WCA. The actual coordinates are typically retrieved from a GPS service over a GPS-enabled network.

In act 408, the WCA aided by SW may determine if the data received from the location device includes GPS coordinates. If the event is not tagged with the relevant GPS data in act 408, the process may resolve back to act 406 and the event may be tagged with GPS data provided by the WCA. The process may then proceed from act 406 to act 409 where the WCA, with the aid of SW, connects online with a server analogous to server 118 of FIG. 1. If GPS data was tagged to the event in act 408, the WCA connects to the server in act 409 without necessarily providing any additional data accept that which is necessary for authentication and client identification.

In act 410, it is determined whether or not a server connection was established. If not, the process continues to attempt to access the server until a connection is made. When a server connection is established as determined at act 410, the WCA uploads the data to the server in act 411.

The server stores the data on behalf of the client in act 412 including the ignition OFF state event and the relevant GPS coordinates of the vehicle position for possible latter access by the client. The term client, in this aspect, may mean more than one authorized user referred to as a client. Anytime after the data is stored for the client in act 412, the service may get a request from the client as determined in act 413. A request may be in the form of a voice call, a Web request, or a message request identifying the client and requesting the latest vehicle location. If the service has not received a request for the data from the client, the process simply loops until a request is made for the data or new data is recorded for the client. It is noted that any new data may override the old data as the latest "updated" location of the vehicle in an OFF state. When the service fields a client request for the data as determined in act 413, the server, aided by SW analogous to SW 119 of FIG. 1, processes the latest event and location data for that client in act 414. Processing may include overlaying or embedding the location visually on a digital map showing the latest vehicle GPS location and the location of the user provided at the time the request was made. The processing may include voice, text, or visually mapped navigation instruction to help the owner or operator of the vehicle to return to the vehicle location.

The server serves the processed information including any navigation instruction to the client appliance (WCA) in act 415. It is noted herein that the information may be served in one event such as in a message reply or as part of an ongoing server session or "navigation session" while the user is connected. The process ends for that user in act 416.

It is noted herein that more than one user may be authorized as a client to request and receive the processed vehicle location and associated information and services. In one aspect, the owner or operator of the vehicle may share a link to the server with other users over a social network or through messaging or other media and may provide authentication information such as a personal identification number (PIN) or password to enable those users to navigate to the server using their own network capable appliances and request and receive the latest location information relative to the vehicle.

In one aspect, a user may pre-register other users to access the server to gain the vehicle location information and associated information and services such as navigation instruction. In another aspect the original user, owner, or operator of the vehicle may add additional users on the fly using a service Website or other interface. In this way, a group of users may separate after leaving the vehicle location and may find their way back to the vehicle at a pre-designated time without the worry of forgetting where the vehicle is.

In still another aspect, the vehicle may be a bus and the authorized users might be passengers of the bus on vacation and currently on an excursion leaving the location of the bus in separate parties with instruction to return to the location at a latter time. These passengers may all be registered and authorized to request and receive vehicle location information and any associated information and services through the server and their wireless communications appliances.

Figure 5:
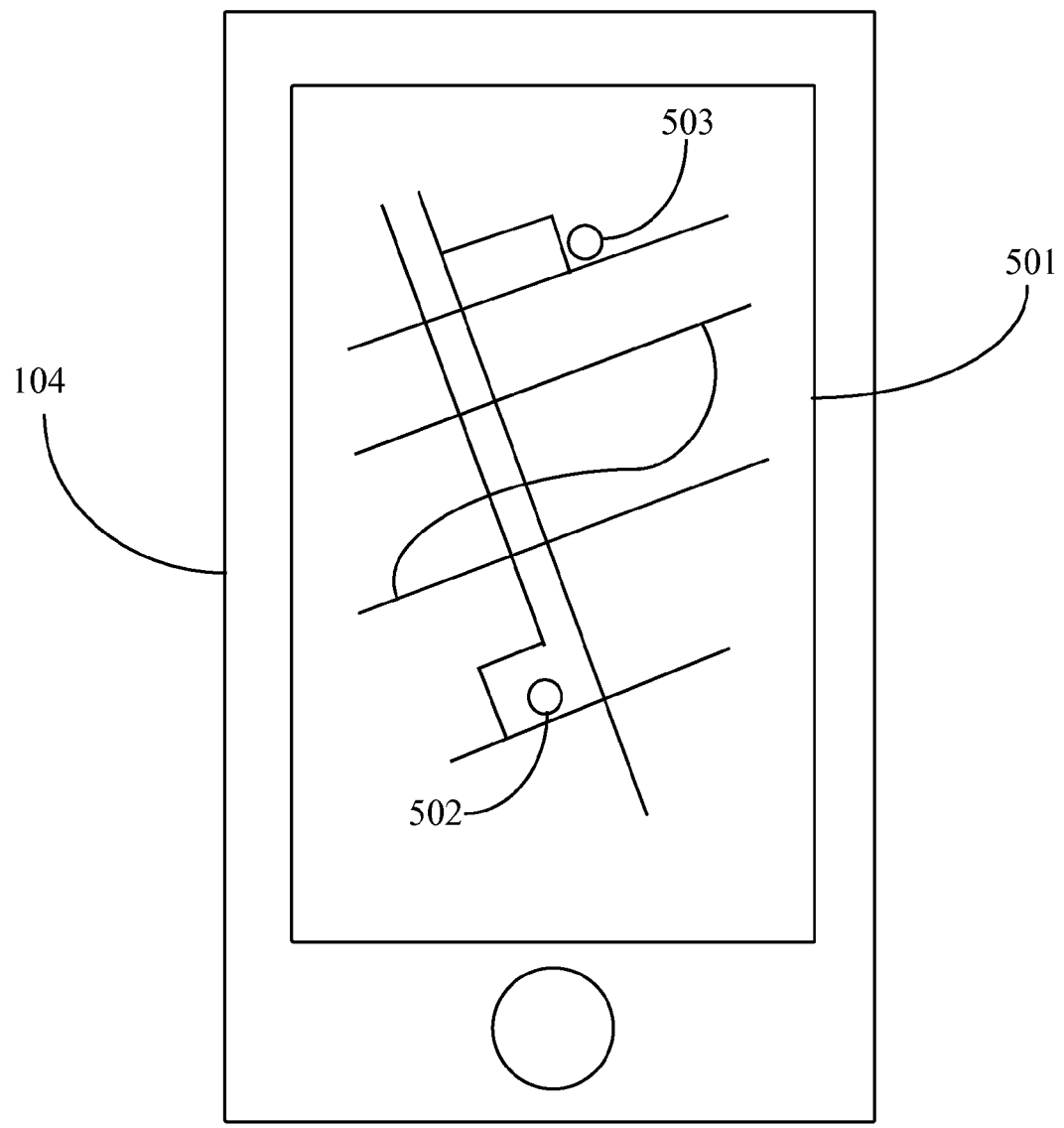
FIG. 5 is a block diagram depicting a digital map with vehicle and user location data presented concurrently on the map.

FIG. 5 is a block diagram depicting a digital map with vehicle and user location data presented concurrently on the map. In one embodiment of the invention, a user might initiate software application 121, wherein a viewable map 501 may be provided from Internet server 118. Map 501 might simply provide a requesting user, or multiple authorized users, with a very simple map with a drop pin location and cross street references depicting the location of the vehicle leaving the user to infer his or her own position with reference to the map. In a preferred embodiment, map 501 might include the vehicle location 502 represented as a fixed icon or other visual indication and a drop pin representation of the current GPS location of the requesting user relevant to the map.

In one embodiment, icon 502 (vehicle location) and icon 503 (current user location) are interactive icons and can be interacted with, such as by selection and expansion, to see the additional information in a pop-up or balloon associated with the icon of relevance. For example, if the vehicle is located in a parking structure that charges for time parked, the current charged amount might be available at the time the request is serviced. In one application, if the vehicle is also under supervision of a security camera, a current cam view containing the vehicle might be available. Moreover, if the vehicle location includes other services, those services may be advertised through the location map as additional information (static ads). There are many possibilities.

What is claimed is:

1. A method comprising:
monitoring the ignition state of a vehicle via an apparatus having a processor and a memory, a connector to an on board diagnostic (OBD) port of a vehicle, and wireless communications circuitry;
upon detecting an ignition off state, reporting at least the state to a network-enabled communications appliance paired for wireless communication with the apparatus;
from the wireless communications appliance, uploading the ignition state, time, date, and location information to a network-connected server;
at the server, validating and storing the state including associated information; and
upon a request received at the server from at least one authorized user, processing the information including vehicle location information and serving it to the at least one authorized user.

2. The method of claim 1 wherein the wireless communications circuitry is Bluetooth™ circuitry.

3. The method of claim 1 wherein the information includes global positioning satellite (GPS) data indicating the last location of the vehicle upon detecting the ignition off state.

4. The method of claim 1 wherein the GPS data is accessed by the vehicle or the apparatus using a GPS device.

5. The method of claim 1 wherein the GPS data is accessed by the wireless communications appliance using a GPS device.

6. The method of claim 1 wherein the server is a location-mapping server.

7. The method of claim 1 wherein the server serves a digital map marking the location of the vehicle and the location of the requestor.

8. The method of claim 7 wherein the server serves navigation instructions from the requestor location to the vehicle location.

9. The method of claim 8 wherein the navigation instructions include voice prompts.

10. The method of claim 1 wherein more than one user is authorized to request and receive the processed vehicle location and associated information and services.

11. The method of claim 1 wherein the authorized user shares a link to the server with other users over a social network or messaging media and provides authentication information to enable those users to request and receive location information relative to the vehicle.

* * * * *